(12) United States Patent
Nasiri et al.

(10) Patent No.: US 10,549,138 B2
(45) Date of Patent: Feb. 4, 2020

(54) METHODS AND SYSTEMS FOR AN EXOSKELETON TO REDUCE A RUNNERS METABOLIC RATE

(71) Applicants: Rezvan Nasiri, Guilan (IR); Majid Nili Ahmadabadi, Tehran (IR); Arjang Ahmadi, Tehran (IR)

(72) Inventors: Rezvan Nasiri, Guilan (IR); Majid Nili Ahmadabadi, Tehran (IR); Arjang Ahmadi, Tehran (IR)

( * ) Notice: Subject to any disclaimer, the term of this patent is extended or adjusted under 35 U.S.C. 154(b) by 0 days.

(21) Appl. No.: 16/383,755

(22) Filed: Apr. 15, 2019

(65) Prior Publication Data

US 2019/0240524 A1     Aug. 8, 2019

Related U.S. Application Data

(60) Provisional application No. 62/657,815, filed on Apr. 15, 2018.

(51) Int. Cl.
| | |
|---|---|
| *A61H 3/00* | (2006.01) |
| *A63B 21/00* | (2006.01) |
| *A63B 23/04* | (2006.01) |
| *A61H 1/02* | (2006.01) |

(52) U.S. Cl.
CPC ..... *A63B 21/00181* (2013.01); *A61H 1/0244* (2013.01); *A61H 3/00* (2013.01); *A63B 21/4011* (2015.10); *A63B 23/0482* (2013.01); *A61H 2003/007* (2013.01); *A61H 2201/165* (2013.01); *A61H 2205/088* (2013.01)

(58) Field of Classification Search
CPC .......... A63B 21/00181; A63B 21/0411; A63B 23/04; A63B 23/085; A63B 23/0482; A61H 3/00; A61H 3/008; A61H 1/0244; A61H 1/0262; A61H 2003/007; A61H 2001/0248; A61H 2201/1284; A61H 2201/164; A61H 2205/088; A61H 1/00; A61H 1/02; A61H 2201/1269; B25J 9/0006; A61F 2/60; A61F 5/01; A61F 2005/0179; A61F 5/0102; A61F 5/0106; A61F 2005/0197
See application file for complete search history.

(56) References Cited

U.S. PATENT DOCUMENTS

2010/0094185 A1*   4/2010   Amundson ........... A61F 5/0102
                                                                602/16

* cited by examiner

*Primary Examiner* — Brian E Pellegrino
*Assistant Examiner* — Rebecca Lynee Zimmerman
(74) *Attorney, Agent, or Firm* — Bajwa IP Law Firm; Harris Zaheer Bajwa

(57) ABSTRACT

An exoskeleton comprising a right hip attachment, a left hip attachment, a belt and a leaf-spring. The leaf-spring configured to couple two hips and apply torque from one respective hip to another respective hip based on the runner's movement and a right gear mechanism and a left gear mechanism, the right gear mechanism and the left gear mechanism comprising respectively of rack-and-pinion mechanism and configured to change an arch of the leaf-spring.

15 Claims, 16 Drawing Sheets

METHODS AND SYSTEMS FOR AN EXOSKELETON TO REDUCE A RUNNERS METABOLIC RATE

CROSS-REFERENCE TO RELATED APPLICATION

This application claims the benefit of priority from U.S. Provisional Patent Application Ser. No. 62/657,815, filed on Apr. 15, 2018, and entitled "EXOSKELETON FOR HIP ASSIST IN CYCLIC MOTIONS," which is incorporated herein by reference in its entirety.

TECHNICAL FIELD

This disclosure relates to robotic and rehabilitation fields, and particularly relate to human-augmentation and bionic fields. More particularly, the present disclosure related to a method and system for facilitating motion in running utilizing sport assistive devices and exoskeletons.

BACKGROUND

The present disclosure finds its genesis in finding efficiencies for human movement. Specifically, facilitation of human activities more easily is the ultimate goal of numerous researchers. Research has led to numerous devices and approaches to aid in increasing speed of motion, weight compensation, metabolic rate reduction, and other aspects that allow a human body to function more efficiently.

Although all of the above-mentioned applications are very important, in recent years, metabolic rate reduction during cyclic tasks (especially walking and running) has gained much attention among the other researches. Accordingly, different types of lower limb exoskeletons are designed to decrease the metabolic rate in running or walking. These exoskeletons may be categorized from different perspectives based on their energy usages. Accordingly, we have two different types of exoskeletons: powered and unpowered. The powered exoskeletons utilize motors and actuators in order to exert the assistive forces/torques; however, the unpowered exoskeletons do not have any actuator or electrical element which consume energy. A class of unpowered exoskeletons are unpowered compliant exoskeletons (UCEs) which relay on their elastic structures in order to facilitate a user's motions. Elastic element of the UCEs absorb a part of energy in a phase of motion and recycle it on the other phase. By doing so, some of dissipated energies can be reused in the cycle of motion, and muscles' activities are minimized. As a result, the metabolic energy consumption during the task is reduced. Although, the UCEs cannot provide the supportive torque as best as powered ones, their worthy features as needless to power supply, easy use, simple design, low construction cost, and light weight encourages the researchers to put effort on design of this category. As it is mentioned, one of the current challenges in UCE design, is metabolic rate reduction in walking and running. However, these traditional UCE's have a limitation that they minimize metabolic rate in walking. Nevertheless, conventional running exoskeletons don't have that much success in reducing metabolic rate of running.

During past years, physiologists understand that, in walking, the most contributing joints and muscles are ankles and Achilles which insert highest torque at the push-off instance. It is also observed that (except the push-off moment) in the rest of a stride lower limb muscles (compared to push-off moment) are almost inactive. This is the biological reason behind the fact that the most effective exoskeletons in walking are which provide torque at the push-off moment. Nevertheless, these exoskeletons are not effective in the running gait. Although walking and running have many similarities in kinematic point of view, they have significant differences in dynamics and muscles' activities perspectives. Unlike walking, in running the contribution of ankle and hip joints are almost equal, and in sprint running, the hip joints have the most contribution. Hence, in order to reduce the metabolic rate in the running gait, the hip joints must be supported the most.

Therefore, there is a need for an exoskeleton that can augment running that overcomes or minimizes the above-referenced difficulties. Exemplary embodiments described below provide an unpowered compliant exoskeleton which assists the hip joints during running.

SUMMARY

An object of the disclosure is to provide new and improved methods and systems for reducing metabolic rate of a runner utilizing an exoskeleton. The following presents a simplified summary of exemplary embodiments of the present disclosure in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter.

In an exemplary embodiment, an exoskeleton may comprise a right hip attachment, the right hip attachment comprising of a right frame and a right ribbon, the right ribbon configured to attach the right frame to a runner's right thigh. Furthermore, the exoskeleton may comprise a left hip attachment, the right hip attachment comprising of a right left frame and a left ribbon, the left ribbon configured to attach the left frame to the runner's left thigh. A belt may be connected to the right hip attachment and the left hip attachment, the belt configured to attach the exoskeleton to the runner's body and a leaf-spring may be attached to the right hip attachment and the left hip attachment, the leaf-spring configured to couple two hips and apply torque from one respective hip to another respective hip based on the runner's movement and a right gear mechanism and a left gear mechanism, the right gear mechanism and the left gear mechanism comprising respectively of rack-and-pinion mechanism and configured to change an arc of the leaf-spring.

In an exemplary embodiment, a method of reducing metabolic rate by utilizing an exoskeleton, comprising attaching an exoskeleton to a runner, the exoskeleton comprising a right hip attachment, the right hip attachment comprising of a right frame and a right ribbon, a left hip attachment, the right hip attachment comprising of a right left frame and a left ribbon, a belt connected to the right hip attachment and the left hip attachment, and a leaf-spring attached to the right hip attachment and the left attachment. In an exemplary embodiment, attaching the exoskeleton to the runner comprises attaching the right frame to the runner's right thigh and attaching the left frame to the runner's left thigh attaching the exoskeleton to the runner's body utilizing the belt. The method may further include applying torque from one respective hip to another hip based on the runner's movement.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for the purpose of illustration and description only and are not intended as a definition of the limits of the present disclosure. Embodiments of the present disclosure will now be described by way of example in association with the accompanying drawings in which.

DETAILED DESCRIPTION

Figure 1A:
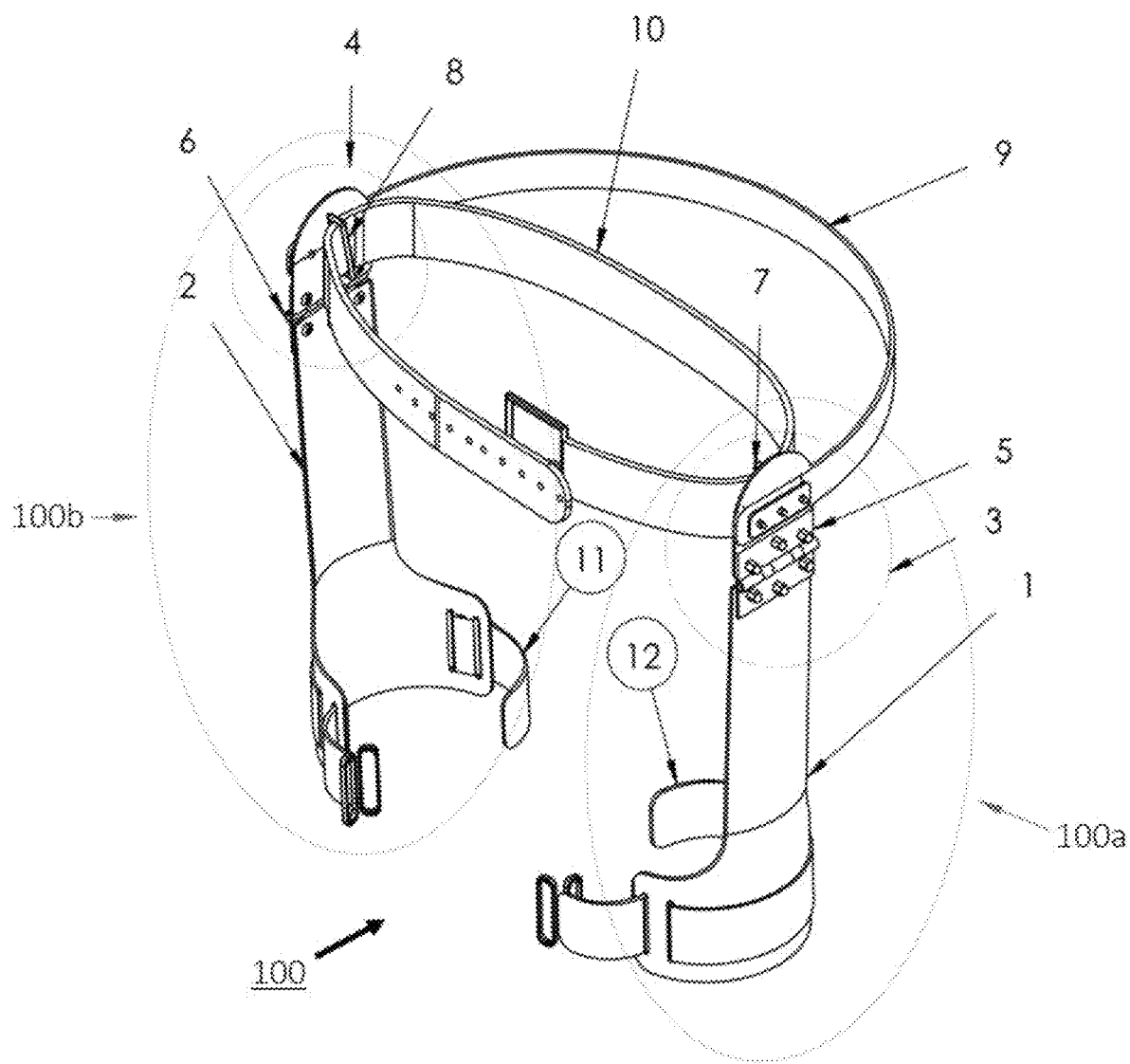
FIGS. 1A and 1B illustrate an exoskeleton, consistent with one or more exemplary embodiments of the present disclosure.

The novel features which are believed to be characteristic of the present disclosure, as to its structure, organization, use and method of operation, together with further objectives and advantages thereof, will be better understood from the following discussion.

In an exemplary embodiment, an exoskeleton and a method for utilizing an exoskeleton which aids in running more efficiently for a runner. The exemplary exoskeleton may comprise of three main parts, a right hip attachment, a left hip attachment, and a leaf-spring connecting the right hip attachment and the left hip attachment. The exemplary leaf spring aids in recycling or transferring energy between hip joints.

Specifically, utilizing exemplary exoskeleton and exemplary methods aids in reducing metabolic rates of a runner. In an exemplary embodiment, an exemplary compliant element, such as a leaf-spring, of the exemplary exoskeleton may aid in dynamic coupling between two hip joints. Accordingly, the exemplary exoskeleton couples a runner's two legs with each other. Specifically, an exemplary leaf-spring may absorb a part of hip energy during the end of swing phase (that is when the associated leg is being extended for forward movement) from one hip and recycle it to accelerate another hip during the start of swing phase for that hip. Since, at the end of swing phase, muscles lose much energy and at the beginning of swing phase, the muscles should compensate the lost energy, this mechanism may allow for capturing a part of dissipated energy in each cycle to be recycled. By doing so, the exoskeleton may provide a supportive torque, which minimizes the muscles' force usage of the other leg. As a result of this process, the hip muscles' overall activity and energy usage is minimized and metabolic rate is reduced.

In an exemplary embodiment, in terms of movement for a person while walking and running, by ignoring additional joints and focusing on the hop joints, during cyclic gaits (running and walking), two legs of a person may be considered as two pendulums which perform a periodic motion with 180 degrees phase shift. In order to create a rhythmic motion, joints may provide energy for both of the respective legs' acceleration and deceleration at the start and end of swing phase for each leg, respectively.

In terms of energy usage, the effect of gravity and speed variation in walking and running make a significant difference. During walking, most of the work for swinging the leg is done by the gravity effect and the hip related muscles are mostly inactive. However, during running, due to the fact that forward velocity is more than walking, gravity may not provide the proper speed for a forward swing. Hence, the hip muscles insert energy in order to perform the periodic motion. Thus, since the swing phase is mostly passive during walking, supporting the hip joint while walking seems to be useless for metabolic rate reduction. In contrast, during running the hip muscles are utilized both for acceleration and deceleration; thus, the metabolic rate may be minimized by hip torque compensation.

In running, since the swing phase for each respective leg is done by hip muscles and so much energy is lost at impact moments, the body get tired faster than walking. In order to improve this cycle of energy loss, exemplary exoskeletons provide a passive-torque-angle-coupling (i.e., dynamical coupling between two legs) mechanism between two hip joints, which prevents negative work and energy usage of a hip and associated muscles, that is the energy utilized for deacceleration. Accordingly, energy from deceleration of one hip may be utilized in order to accelerate the other one. By doing so, negative work of the hip muscles is reduced, therefore, a part of dissipated energy in each cycle is reduced. Although, the efficiency of the hip muscles in the negative work is higher than positive work, by decreasing the energy consumption of the muscles' collectively, exemplary exoskeletons may reduce the metabolic rate of a runner. Reducing the metabolic rate and recycling energy aids in improving performance of a runner, specifically in instances which comprise an exhaustive activity such as spirit running.

Figure 1B:
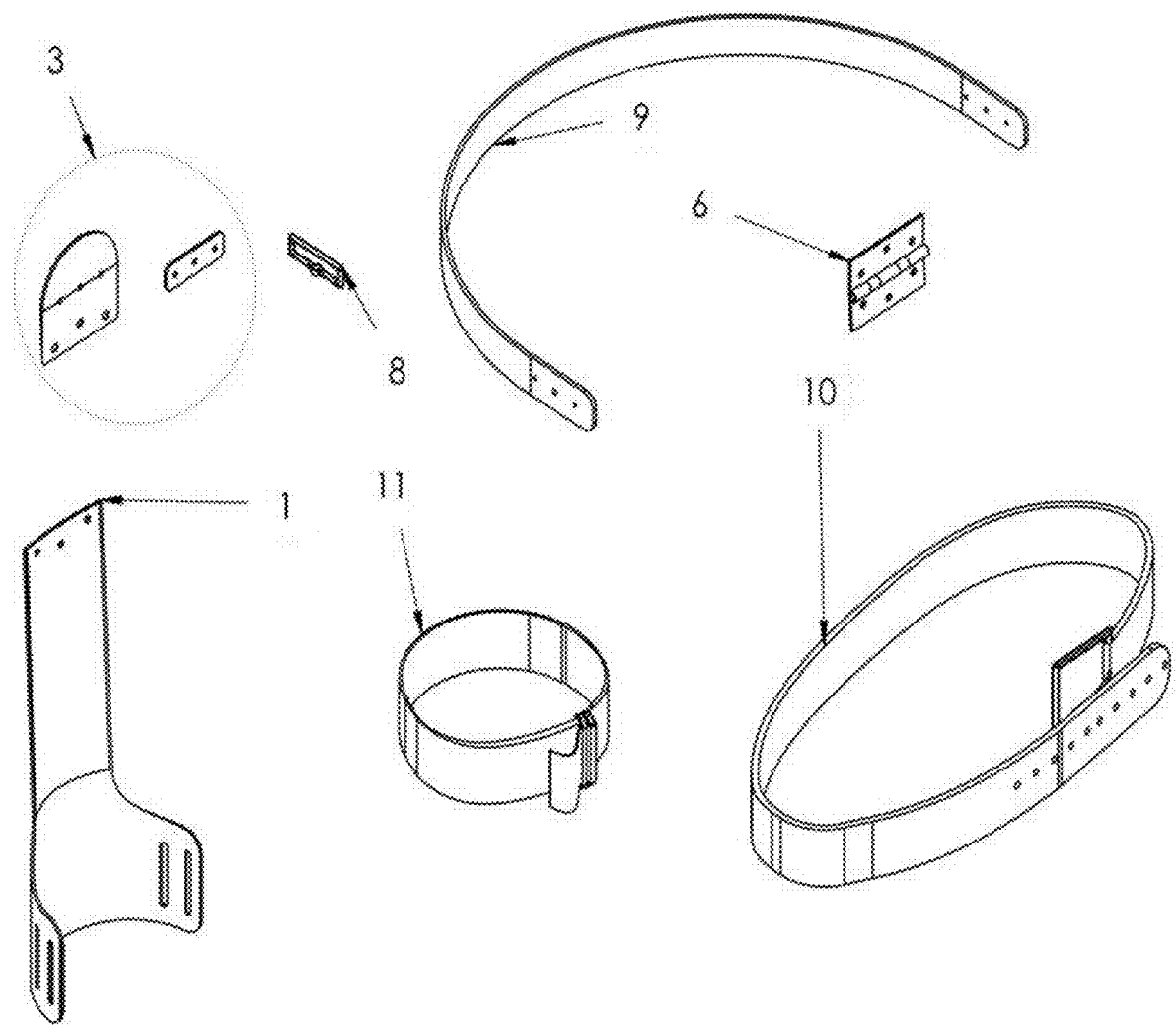

FIGS. 1A and 1B illustrate an exoskeleton, consistent with one or more exemplary embodiments of the present disclosure. As illustrated in FIG. 1A, an exemplary exoskeleton 100 comprises left hip attachment 100a, right hip attachment 100b and bended leaf-spring 9. In detail, exoskeleton 100 comprises two frames (1,2), revolute joints (5,6), set of screws and nuts (3,4), swivel-eye-bolts (7,8), a bended leaf-spring (9) which applies torque as a linear function of deflection between hip joints, a belt (10), and webbing ribbons (11-12).

Figure 1C:
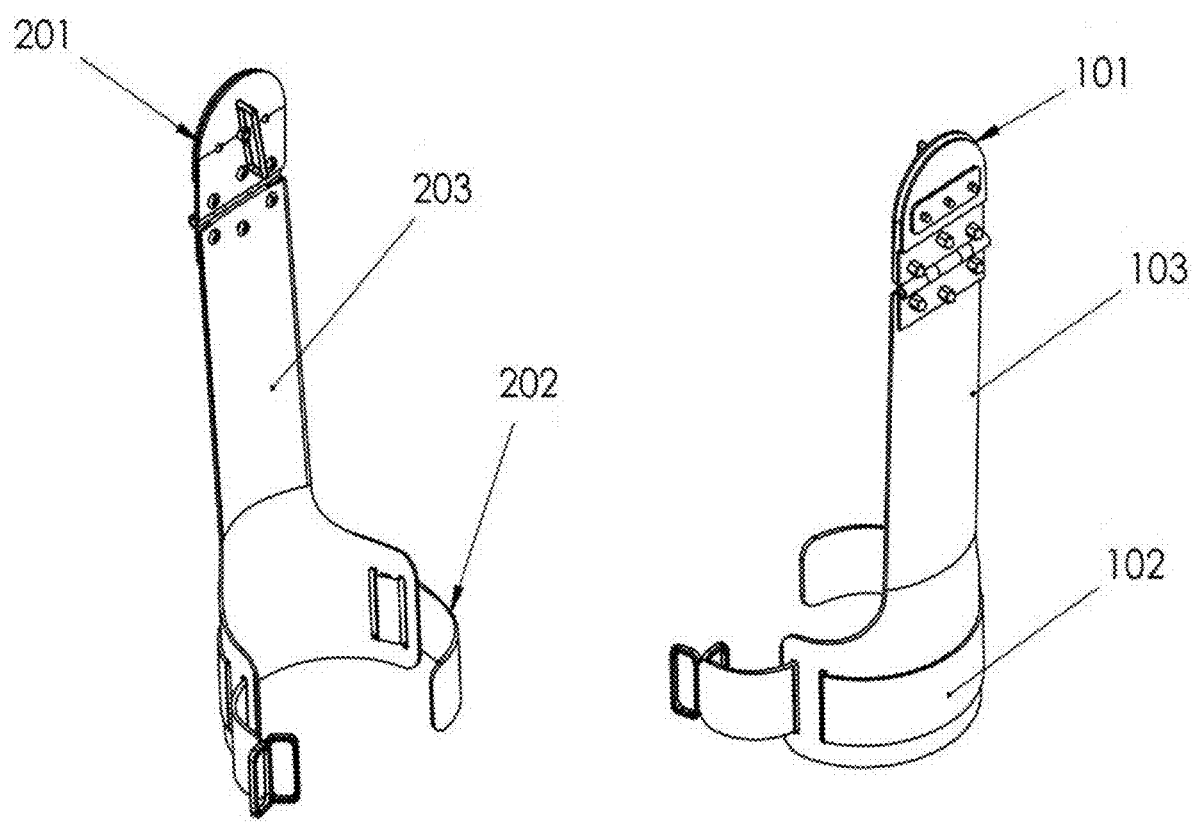
FIG. 1C illustrates a detailed perspective of frames, consistent with one or more exemplary embodiments of the present disclosure.

FIG. 1C illustrates a detailed perspective of frames (1,2), consistent with one or more exemplary embodiments of the present disclosure. Each of the respective frames (1,2) may comprises of three parts; upper (101,201) and lower (103, 203) segments, and some slots (102,202) for webbing ribbons (11,12). In order to prevent motion limitation (hard constraint) in a frontal plane, the upper (101,201) and lower (103,203) segments of the frames (1,2) may be coupled by using simple revolute joints (5,6). The revolute joints (5,6) may be fastened with the frames (1,2) by a set of screws and nuts (3,4). In exemplary embodiments, the webbing ribbons (11,12) may fasten the frames' lower segments (103,203) to a user's thighs by using the considered slots (102,202). The frames' upper segments (101,201) may be connected with the belt (10) by using two swivel-eye-bolts (7,8) which may freely rotate with respect to the upper segments of frames (101,201). The bended leaf-spring may be screwed with upper segments (101,201) of the frames by set of screws and nuts (3,4). The leaf-spring (9) may be fixedly attached at a 90 degrees angle and may hold its 90 degree rotation with upper segments of frames at the contact points (3-4). In an exemplary embodiment, leaf-spring 9 may be connected at a different angle other than 90 degrees. However, at the contact points, the connected angle may remain the same, even in motion, thereby bending the exemplary leaf-spring 9 during motion.

Figure 2A:
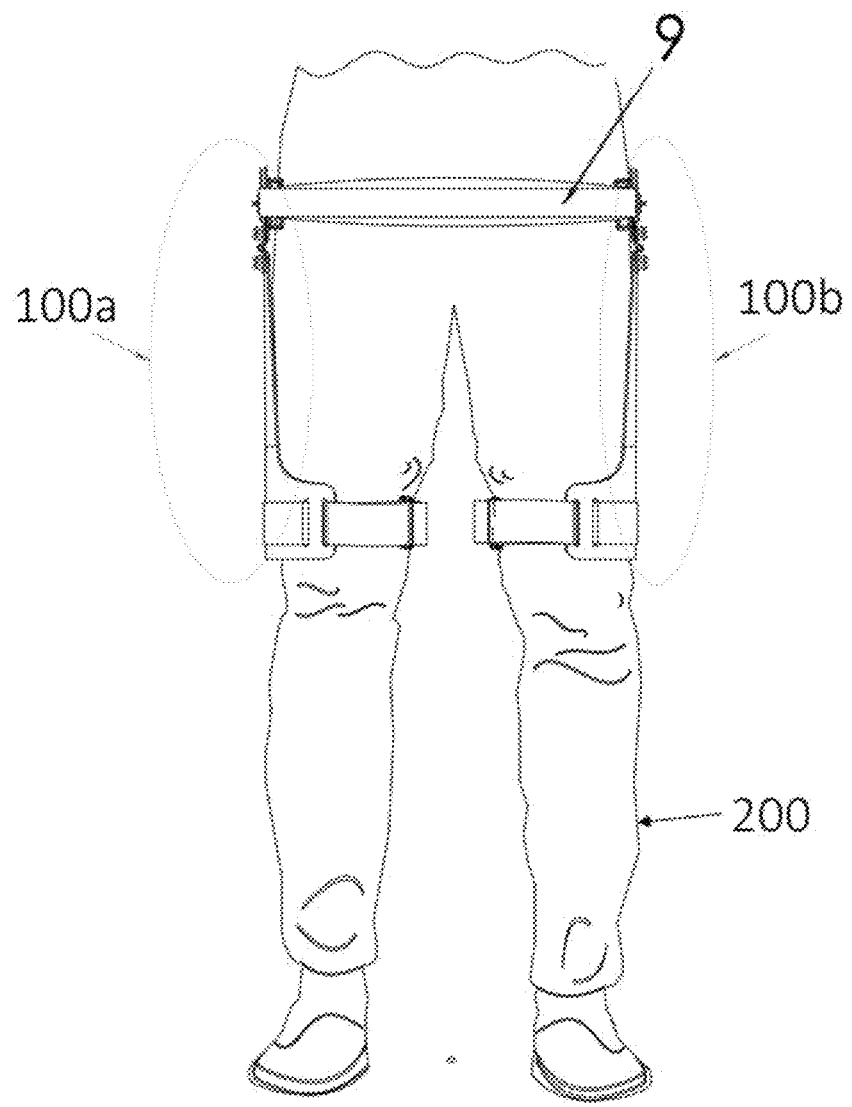
FIG. 2A illustrates a back view of a runner wearing an exoskeleton, consistent with one or more exemplary embodiments of the present disclosure.
Figure 2B:
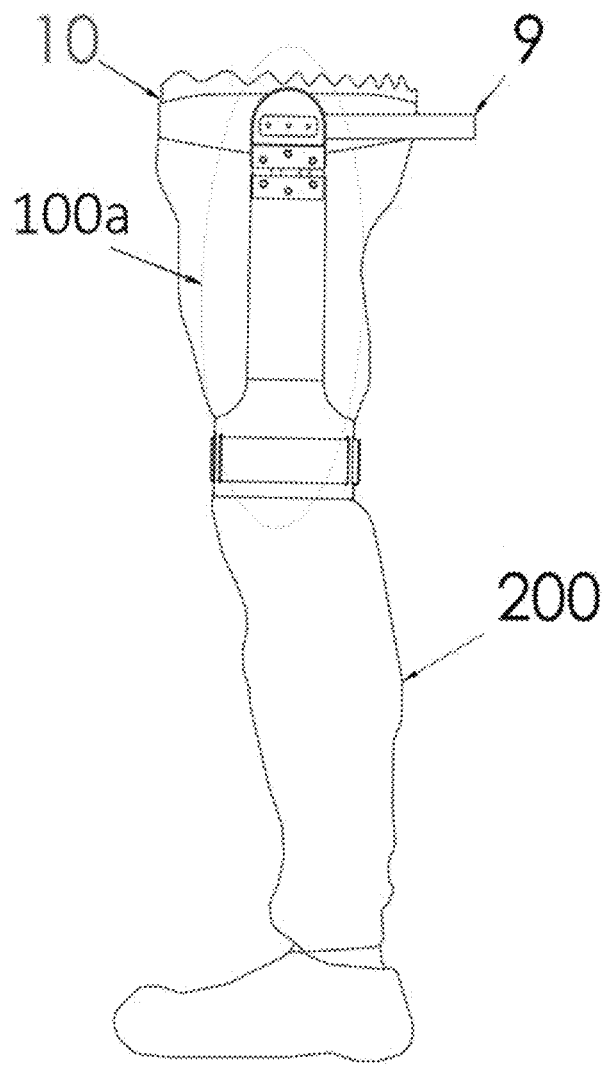
FIG. 2B illustrates a side-view of a stationary runner wearing an exoskeleton, consistent with one or more exemplary embodiments of the present disclosure.
Figure 2C:
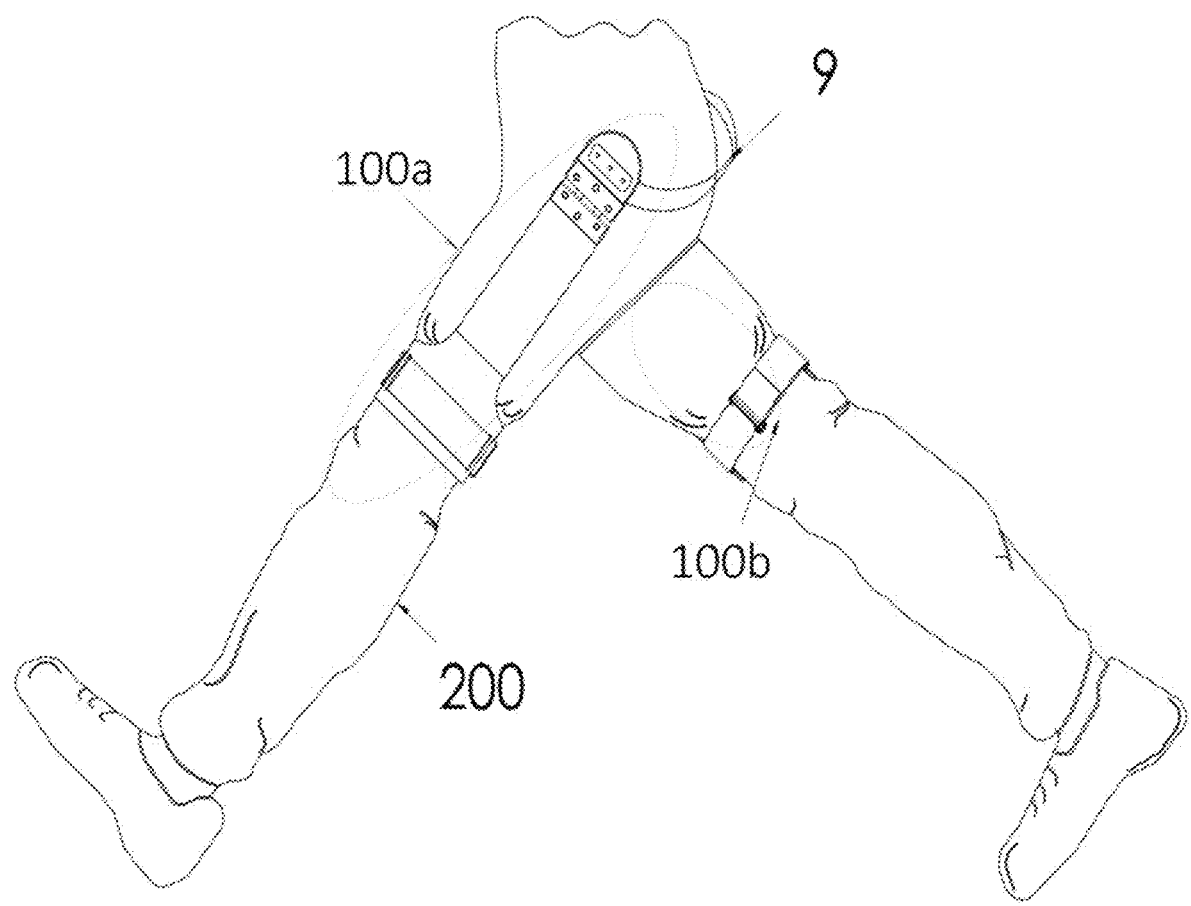
FIG. 2C illustrates a side-view of a runner in motion wearing an exoskeleton, consistent with one or more exemplary embodiments of the present disclosure.

With respect to transfer of energy between hips, taking one step forward by a runner creates deflection between two frames (1,2) in the sagittal plane as illustrated in FIGS. 2A-C. FIG. 2A illustrates a back view of a runner wearing an exoskeleton, consistent with one or more exemplary embodiments of the present disclosure. As may be seen, runner 200 is wearing skeleton with left hip attachment 100a attached to the left hip and the right hip attachment 100b attached to the right hip. Leaf spring 9 is located behind the back of runner 200. FIG. 2B illustrates a side-view of a stationary runner wearing an exoskeleton, consistent with one or more exemplary embodiments of the present disclosure. As may be seen, there is a gap of a certain distance between body of runner 200 and leaf-spring 9. Additionally, belt 10 may aid in keeping exoskeleton attached to runner 200's body. FIG. 2C illustrates a side-view of a runner in motion wearing an exoskeleton, consistent with one or more exemplary embodiments of the present disclosure. Specifically, left leg of runner 200 appears extended forward while right leg of runner 200 is behind runner's torso. Due to the fact that leaf-spring 9 is attached fixedly at a 90 degrees angle with both left hip attachment 100a and right hip attachment 100b, a bend and a twist may occur in leaf spring 9. In exemplary embodiments, this may allow transfer of energy between hips of runner 200. Specifically, the leaf-spring 9 may engage, twist, and apply torque to the other hip. The applied torque by leaf-spring is transferred to the thighs and consequently hips by the frames (1,2). In an exemplary embodiment, the bended leaf-spring's 9 torque-angle profile may be linear. As described in further detail below, utilizing exemplary exoskeleton may lead to metabolic rate reduction due to the linear torque-angle relation. In an exemplary embodiment, exemplary leaf-spring 9 may be manufactured utilizing aluminum or carbon-fiber material.

Figure 3:
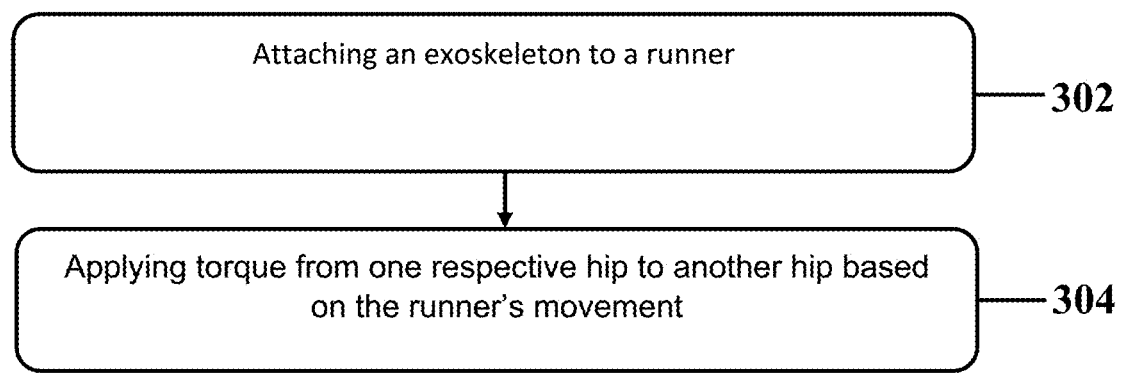
FIG. 3 illustrates a flowchart of a method for reducing metabolic rate by utilizing an exoskeleton, consistent with one or more exemplary embodiment of the present disclosure.

FIG. 3 illustrates a flowchart of a method 300 for reducing metabolic rate by utilizing an exoskeleton, consistent with one or more exemplary embodiment of the present disclosure. In an exemplary embodiment, exoskeleton 100 may be utilized for implementation of method 300.

Figure 4A:
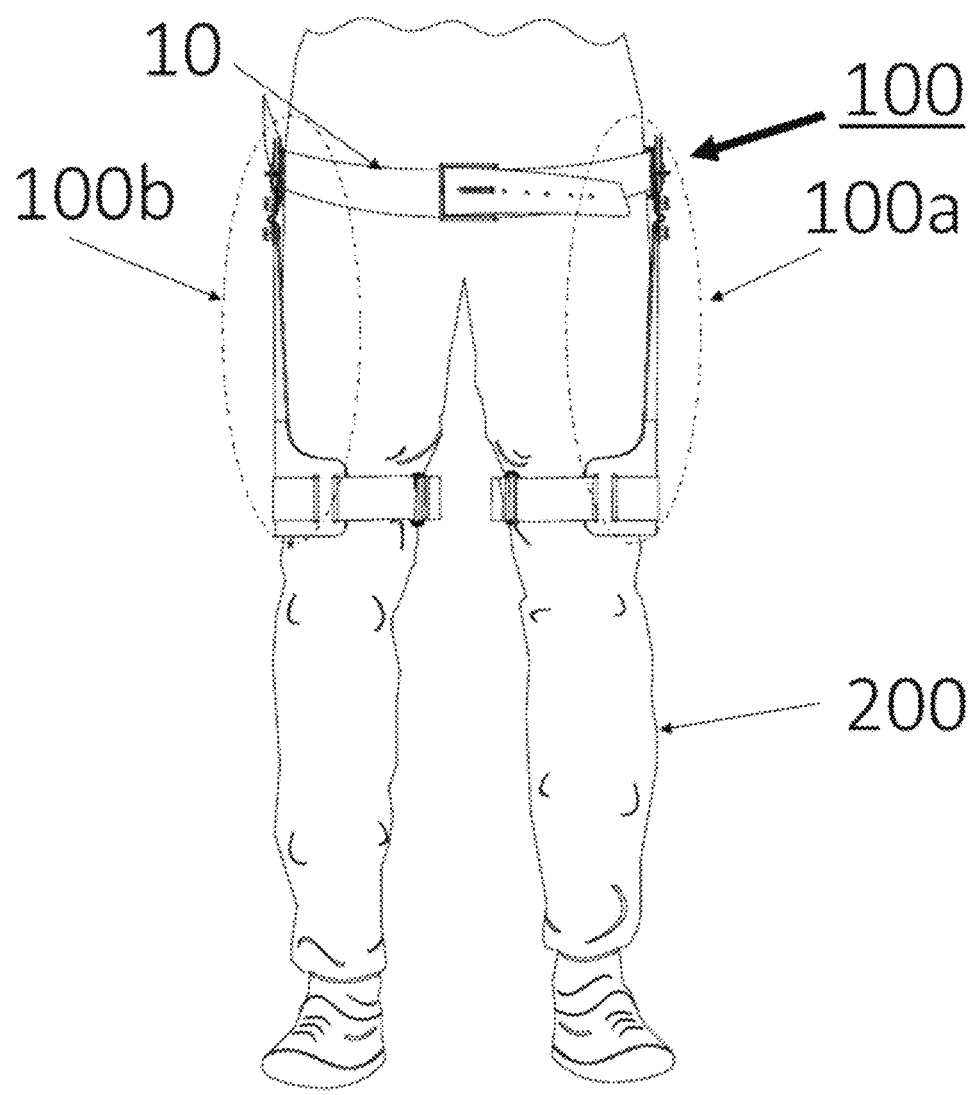
FIGS. 4A and 4B illustrate an exoskeleton worn by a runner from a front-perspective and a rear-perspective respectively, consistent with one or more exemplary embodiment of the present disclosure.
Figure 4B:
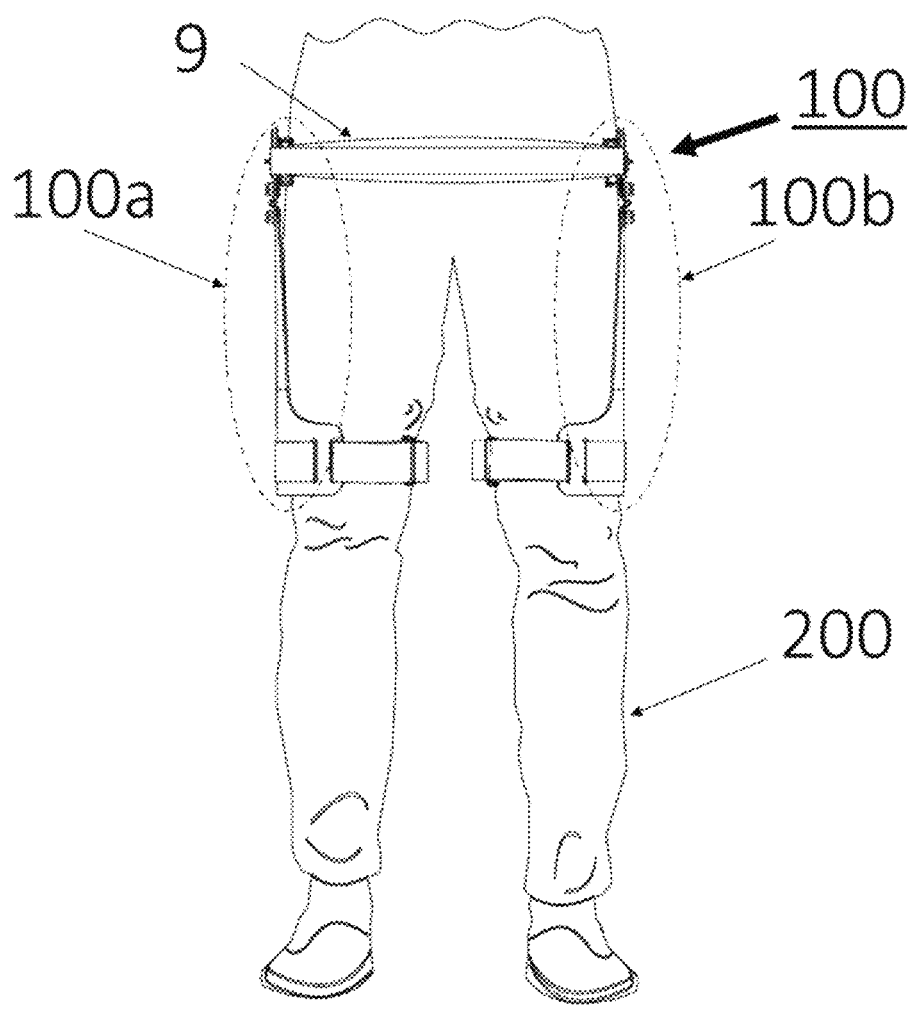

Step 302 may comprise strapping on the exoskeleton to a user. FIGS. 4A and 4B illustrate an exoskeleton 100 worn by a runner 200 from a front-perspective and a rear-perspective respectively, consistent with one or more exemplary embodiment of the present disclosure. As can be seen, when strapped, on leaf-spring 9 extends on the backside of a region connection one hip to the other hip of runner 200. In an exemplary embodiment, left hip attachment 100a may be attached to left hip of runner 200, right hip attachment 100b may be attached to right hip of runner 200, with belt 10 strapping exoskeleton 100 to waist of runner 200.

Step 304 may include transferring energy from one hip to the other of user responsive to a running motion of the user. As discussed above, with respect to FIGS. 2A-C, as movement of a runner's hips occurs, leaf spring 9 is bent. As discussed above, leaf-spring 9 is attached at a fixed 90 degrees angle to respective parts of the respective frames. Accordingly, when a respective hip is not at a stationary position and an angle is created, bent-leaf-spring 9 is twisted. This allows the leaf spring to transfer energy from one hip to the other hip, consistent with one or more exemplary embodiments of the present disclosure.

Figure 5:
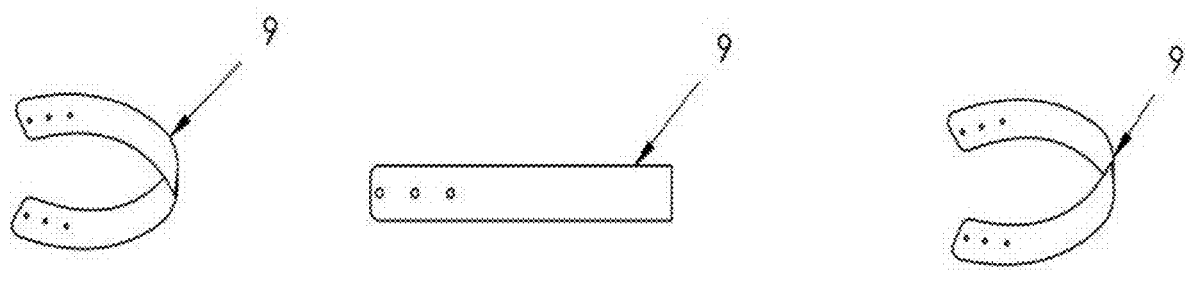
FIG. 5 illustrates three states of a leaf-spring during a running motion of a runner, consistent with one or more exemplary embodiments of the present disclosure.

Hence, by taking one step forward, which creates deflection between two frames (1,2) of hip attachments (100a, 100b) in a sagittal plane as illustrated in FIG. 2C, the leaf-spring (9) engages, twists, and applies the torque to hips. The applied torque by leaf-spring is transferred to the thighs and consequently hips by the frames. FIG. 5 illustrates three states of leaf-spring 9 during a running motion of a runner, consistent with one or more exemplary embodiments of the present disclosure. First state 500 represents when a user is static or stationary or both the hips are aligned. Accordingly, in the first state, leaf-spring 9 may be behind an exemplary runner. Second state 502 represents a condition when an exemplary left leg of a runner is extended forwarded and an exemplary right leg is behind the main body of a runner. As may be seen, at respective connections to left frame 1 (not illustrated in this figure) and right frame 2 (not illustrated in this figure), leaf-spring 9 maintains a 90 degrees angel cause a twist in leaf-spring 9. Third state 504 represents a condition when an exemplary right leg of a runner is extended forwarded and an exemplary left leg is behind the main body of a runner, that is, it is the opposite of the exemplary second state 502. As may be seen here as well, at respective connections to left frame 1 (not illustrated in this figure) and right frame 2 (not illustrated in this figure) leaf-spring 9, leaf-spring 9 maintains a 90 degrees angel cause a twist in bent-leaf-spring 9, opposite of the twist in state 502. As frame 9 moves between respective state 500 to 502, then state 502 to 500, then 500 to 504, and so on, toque is alternatively transferred between the respective hips, according to exemplary embodiments.

In an exemplary embodiment, negative energy principles of exemplary embodiments may be applied utilizing a mechanical device. For example, negative energy from one leg may be absorbed and an equivalent energy may be applied to the other leg by a mechanical device (9) equivalent to the absorbed negative energy.

In an exemplary embodiment, the shape of the leaf spring may be shaped like half a circle or other appropriate shape. However, exemplary embodiments may connect only be fixedly to respective right and left hip attachment parts, specifically the respective frames.

In an exemplary embodiment, an exemplary exoskeleton that provides an adaptive stiffness in instances where a runner may seek to change an impact of stiffness of an exemplary leaf spring.

Figure 6A:
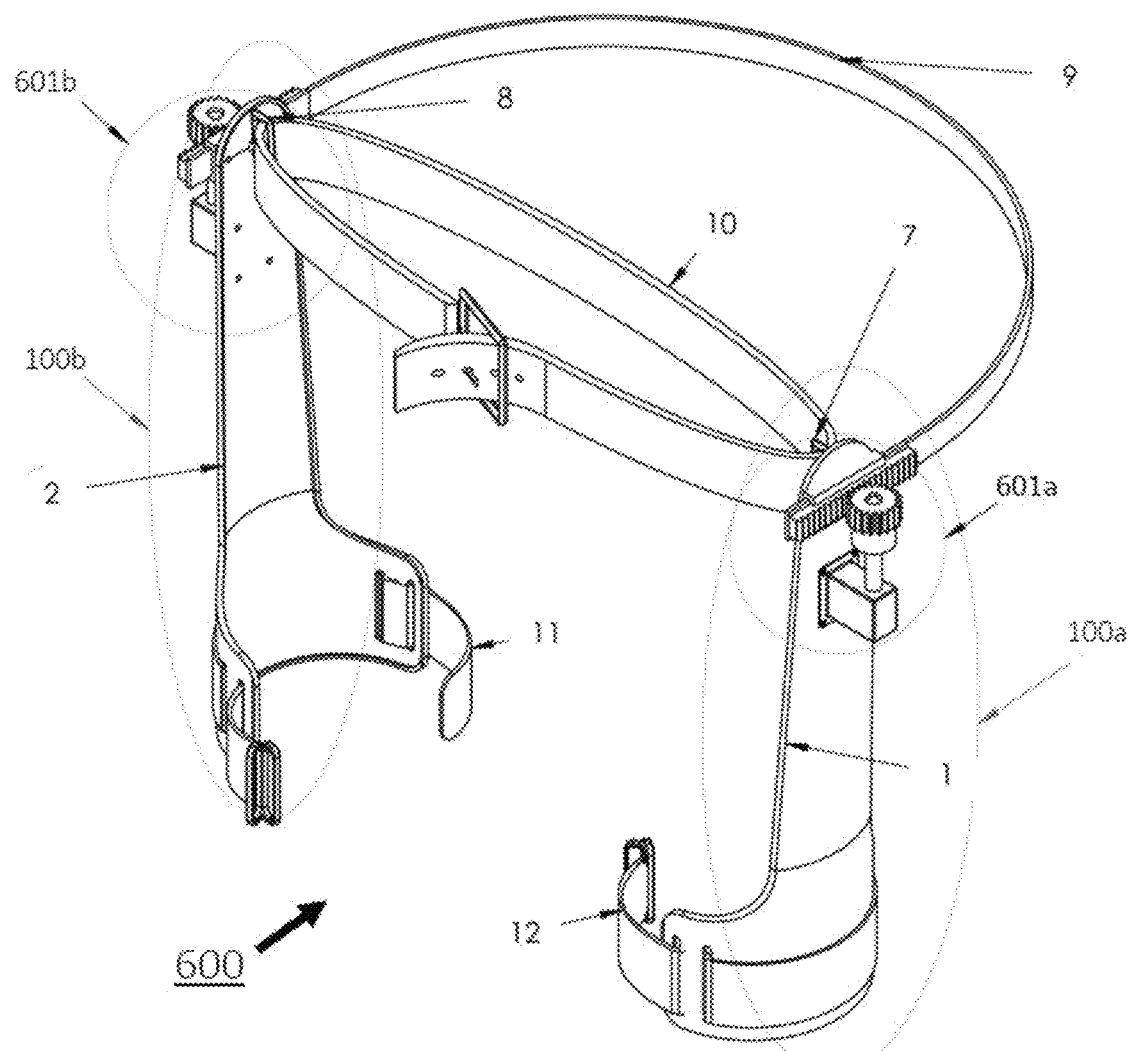
FIGS. 6A and 6B illustrate an exoskeleton, consistent with one or more exemplary embodiments of the present disclosure.
Figure 6B:
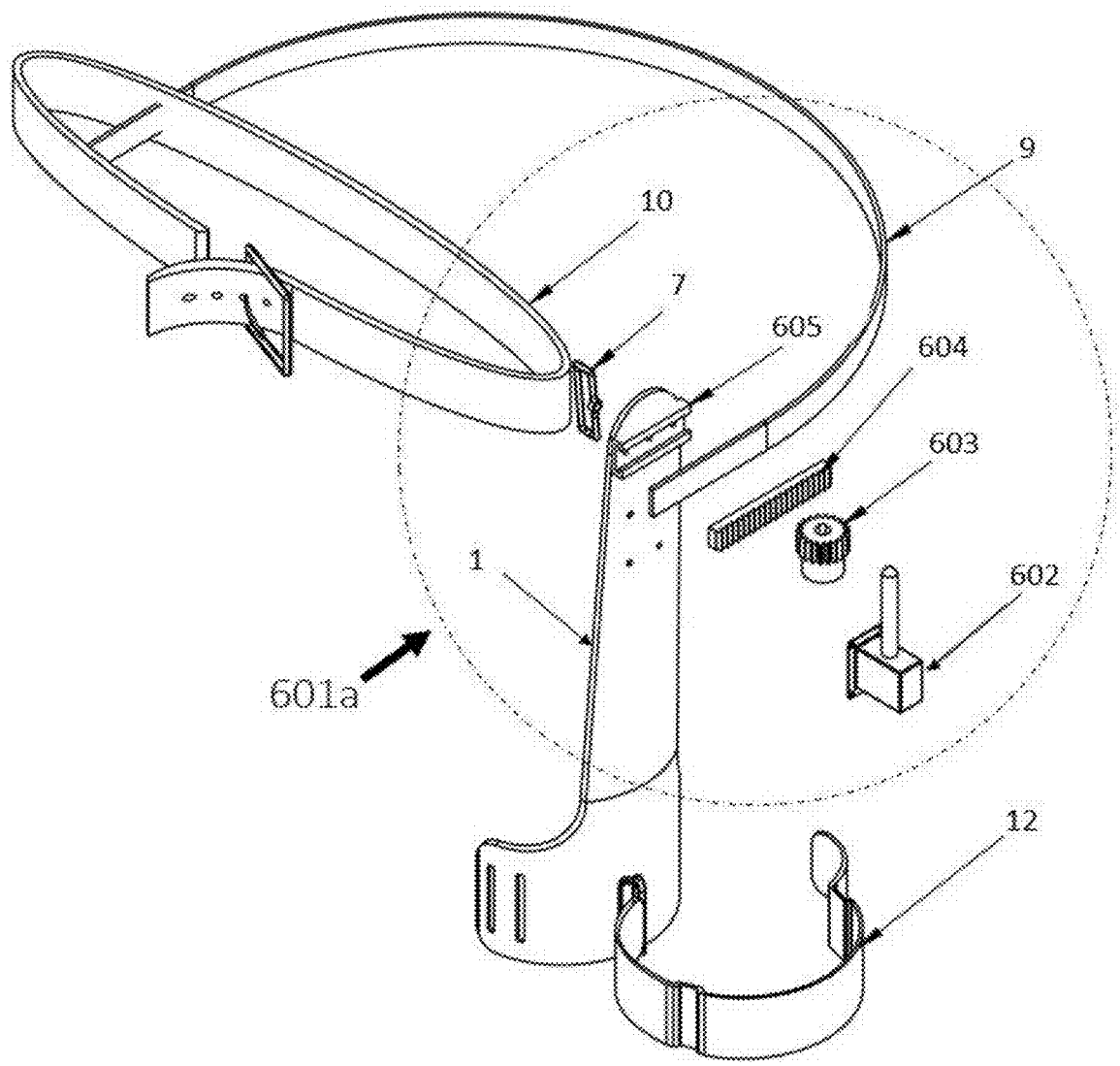

FIGS. 6A and 6B illustrate an exoskeleton, consistent with one or more exemplary embodiments of the present disclosure. As illustrated in FIGS. 6A-B, exemplary exoskeleton 600 may be similar to exoskeleton 100 but it may further contain gear mechanisms 601a and 601b in lieu of set of screws and nuts 3 and 4. Specifically, gear mechanism 601a and 601b may contain everything contained in respective set of screws and nuts 3 and 4, in addition to further materials. In an exemplary embodiment, gear mechanisms 601a and 601b are explained with respect to gear mechanism 600. However, it may be understood that respective gear mechanisms 601a and 601b may be similar in functionality and relation to other objects but may be opposite of each other in location due to their respective relationships with a potential runner's right and left hips respectively as may be clear from the figures.

Figure 6C:
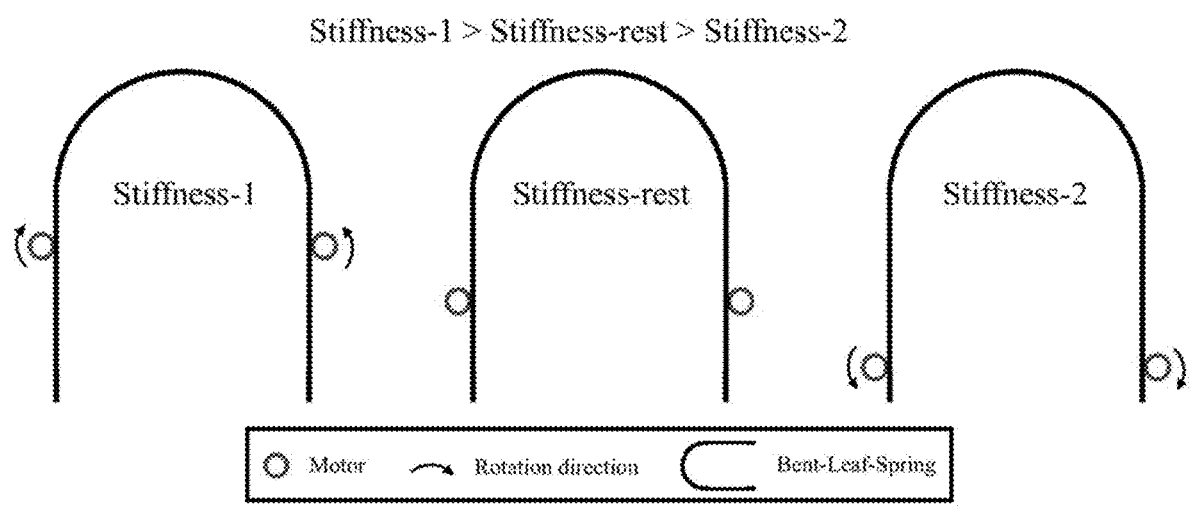
FIG. 6C illustrates how worm-gear motor may change the effective/engaged arc of a leaf-spring, consistent with one or more exemplary embodiments of the present disclosure.

Referring back to FIG. 6B, gear mechanism 601a may include worm-geared motor 602. Worm-geared motors 602 may be attached to leaf spring 9 using an exemplary rack-and-pinion structure comprising rack 604 and pinion 603. Accordingly, utilizing worm-geared motor 602 (or the corresponding worm-geared motor on the other side for gear mechanism 601b), a runner may change an engaged arc of leaf-spring 9. FIG. 6C illustrates how worm-gear motor 602 may change the effective/engaged arc of the leaf-spring 9, consistent with one or more exemplary embodiments of the present disclosure. Accordingly, a change in an exemplary act of leaf-spring 9 may lead to changing of overall stiffness of leaf-spring 9. In an exemplary embodiment, by increasing the engaged arc of leaf-spring 9, the total stiffness may be decreased. Similarly, by reducing the engaged arc of leaf-spring 9, the overall stiffness may be increased. In an exemplary embodiment, in Stiffness-1 the arc is decreased by turning the mechanism in the direction illustrated.

In an exemplary embodiment, the adaptive extension of this exoskeleton may not be considered unpowered anymore because it uses two worm-geared motors. However, the energy usage due to adaptation is sufficiently low if the gear-ratio of the worm-geared motor is sufficiently high. In addition, the device only consumes energy for the adaptation process and after adaptation process the motors are off and energy consumption at the rest condition is zero; due to non-back-drivability of the worm-geared motors. Accordingly, utilizing this exemplary structure, a runner may easily optimize the exoskeleton in an online manner by utilizing the bio-feedback from the user; e.g., EMG signal or Energy Expenditure (Gas-Analyzer).

EXAMPLE

Figure 7:
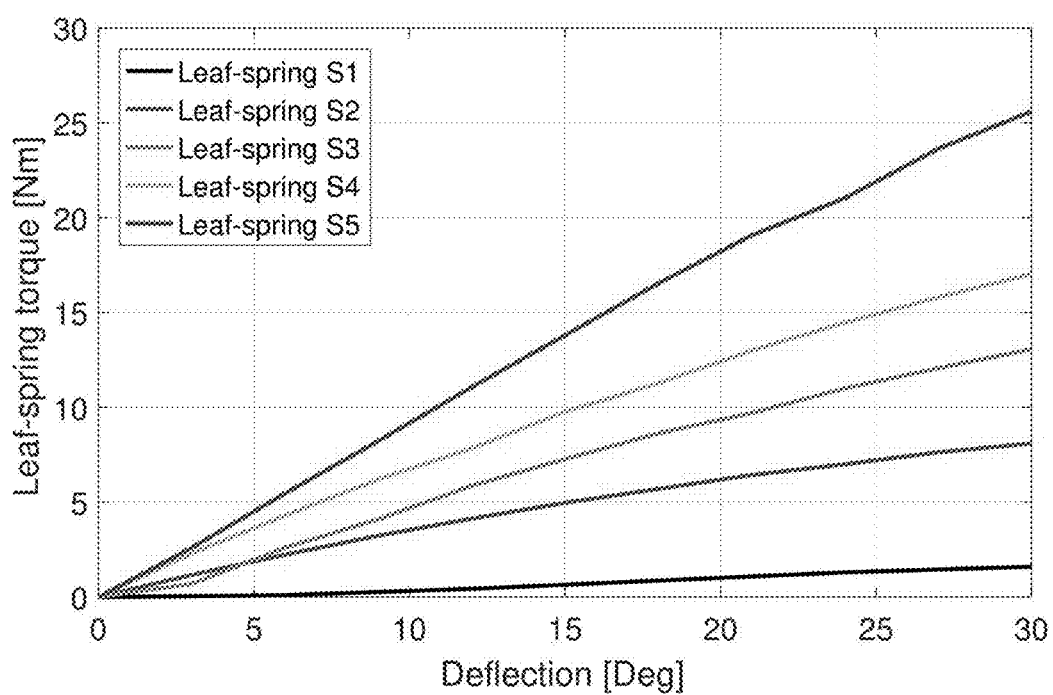
FIG. 7 illustrates test results related to a bended leaf-spring with different stiffness under torsion, consistent with one or more exemplary embodiments of the present disclosure.

In an exemplary embodiment, the exemplary exoskeleton structure with the leaf-spring was analyzed creating the desired linear torque-deflection profile. The bended leaf-spring was tested with different stiffness under torsion test the results are illustrated in FIG. 7, consistent with one or more exemplary embodiments of the present disclosure. As is apparent by the results, the exemplary exoskeleton utilizing a leaf spring may provide a linear torque profile as a function of deflection of two hip joints. Since the required deflection range for running at 2.6 mls is lower than 30 Deg, the leaf-spring may provide linear torque-deflection profile between 0 Deg and 30 Deg deflections. According to the results, by using this exemplary leaf-spring, the results produce linear bi-articular compliances with different coefficients. The subjects' mid weight was 75 Kg; hence, the chosen stiffness is K=0.78×75=58.5 Nm/rad, and the leaf-spring S5 with K=50.6 Nm/rad was selected for experiment. In exemplary embodiments, stiffness of the spring may be 2.9, 16.9, 26.0, 34.5, or 50.6 Nm/rad respectively.

Figure 8:
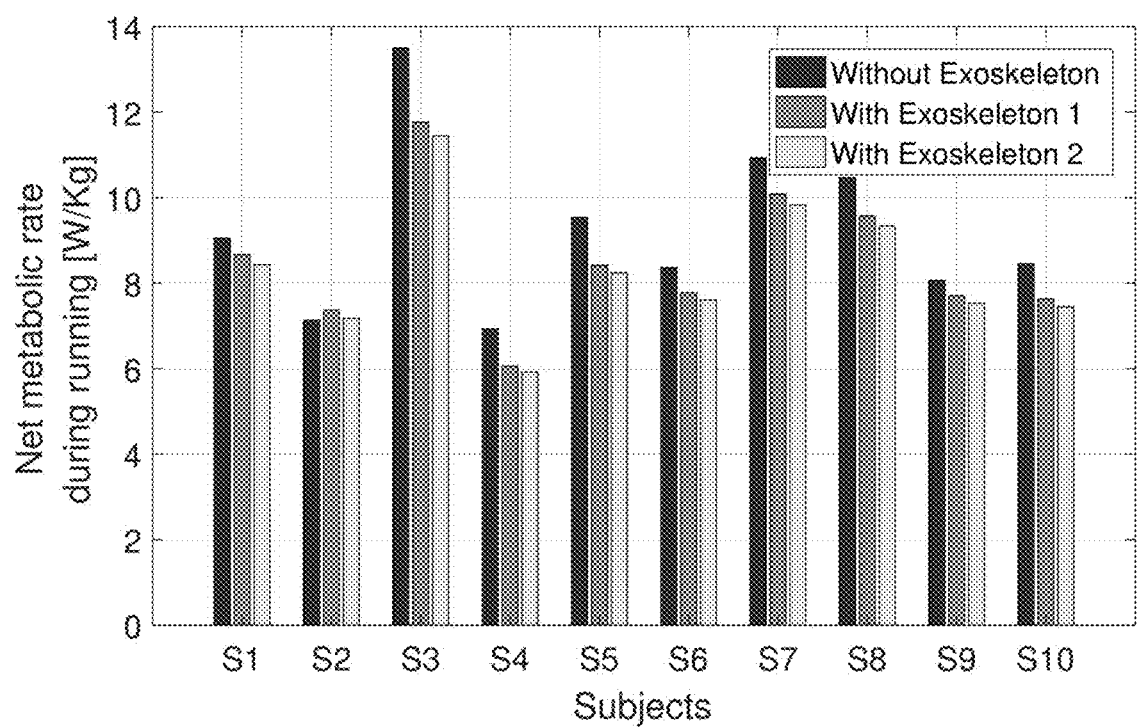
FIG. 8 illustrates run test results, consistent with one or more exemplary embodiments of the present disclosure.

So as to analyze the performance of the exoskeleton for metabolic rate reduction, a normal running test was designed. The duration of this test was 10 minutes where in the first three minutes, the speed of treadmill was increased from steady condition to 2.5 mls. After this transient time, subjects ran at a constant speed equal to 2.5 mls for 7 min. The transient phase was considered for (1) having a smooth warm-up before the main test and (2) preventing from shock of an instant start on subjects. All of the subjects had at least 30 minute training sessions with the device on several days before the main test. In addition, each subject performed two tests "with exoskeleton" (by optimum stiffness K=50.6 Nm/rad) and "without exoskeleton". Tests were applied on two consecutive days at morning to prevent fatigue effects. And for preventing the effect of ordering, half of the subjects in the first day had "with exoskeleton" test and the other subjects in the first day have "without exoskeleton" test. In each test, the average power of subjects was computed by using P=16.58 VO2+4.52 VCO2 divided by the body mass. The result of the test for the ten subjects is presented in FIG. 8, consistent with one or more exemplary embodiments of the present disclosure. The mass and height of the subjects are m=75±9 Kg and h=178±8 cm. According to this figure, if we consider the mass of exoskeleton in body mass, reduction is 10.2±1.5 (mean±s.e.m.) by P=0:0004 (P-value) and without considering the exoskeleton's weight, reduction is 8.0±1.5 (mean±s.e.m.) by P=0:0016 (P-value). The mass of constructed prototype exoskeleton (which is made of which is made of Aluminum) is about 1.8 Kg but it can be reduced less than 1 Kg with Carbon-Fiber material.

Figure 9:
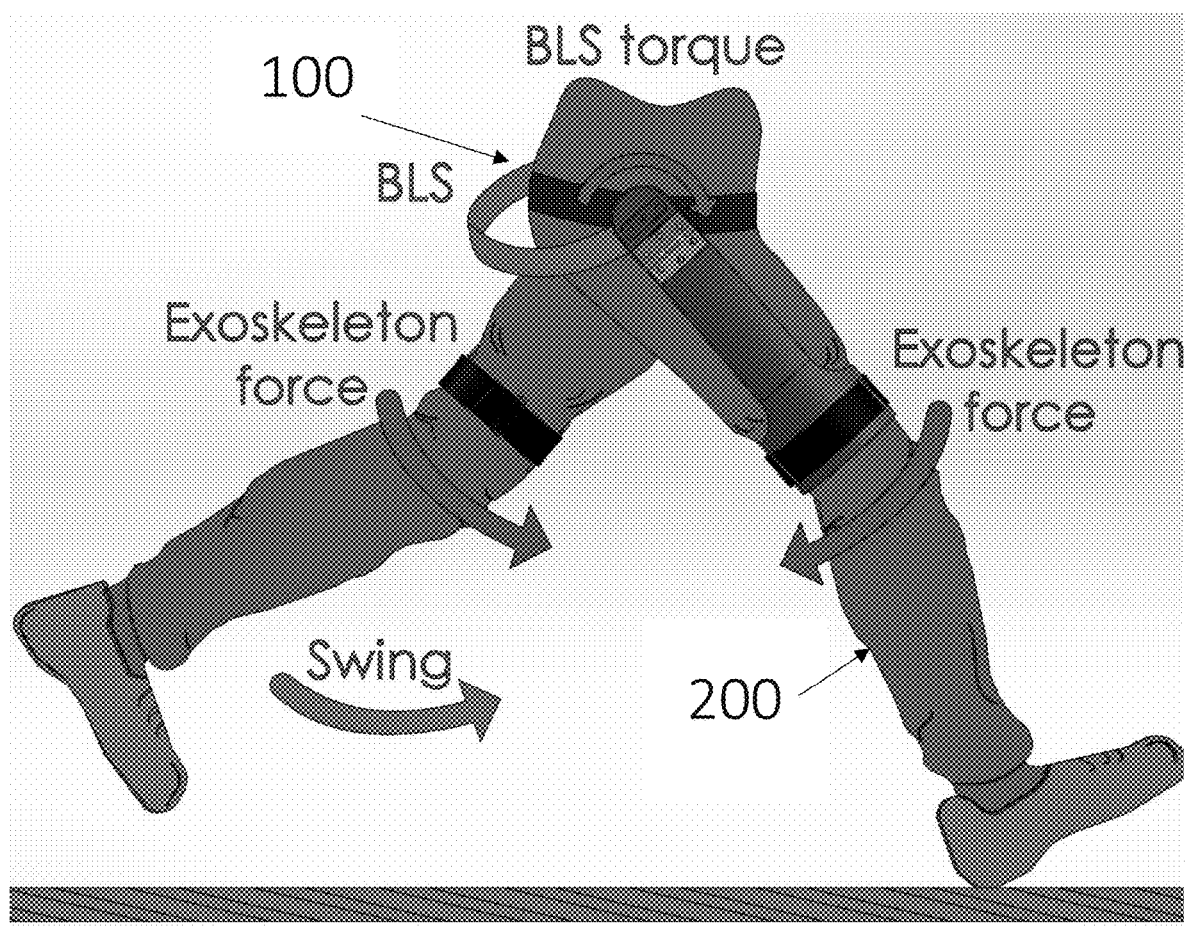
FIG. 9 illustrates energy transfer by an exoskeleton consistent with one or more exemplary embodiments of the present disclosure.

FIG. 9 illustrates energy transfer by an exoskeleton consistent with one or more exemplary embodiments of the present disclosure. Specifically, directions of the force provided to a runner by an exemplary exoskeleton are illustrated.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed:

1. An exoskeleton, comprising:
    a right hip attachment, the right hip attachment comprising of a right frame and a right ribbon, the right ribbon configured to attach the right frame to a runner's right thigh;
    a left hip attachment, the right hip attachment comprising of a right left frame and a left ribbon, the left ribbon configured to attach the left frame to the runner's left thigh;
    a belt connected to the right hip attachment and the left hip attachment, the belt configured to attach the exoskeleton to the runner's body;
    a leaf-spring attached to the right hip attachment and the left hip attachment, the leaf-spring configured to couple two hips and apply torque from one respective hip to another respective hip based on the runner's movement; and
    a right gear mechanism and a left gear mechanism, the right gear mechanism and the left gear mechanism configured to change an arc of the leaf-spring.

2. The exoskeleton according to claim 1, wherein the leaf-spring configured to apply torque from one respective hip to the other respective hip based on the runner's movement comprises:
    the-spring configured to bend responsive to movement of a respective hip in a forward direction and to apply the torque to the hip when engaged in a proceeding backwards motion.

3. The exoskeleton according to claim 1, wherein the leaf-spring configured to apply torque from one respective hip to the other respective hip based on the runner's movement comprises:
    the-spring configured to bend responsive to movement of a respective hip in a forward direction and to apply the torque to the hip when engaged in a proceeding backwards motion.

4. The exoskeleton according to claim 1, wherein the leaf-spring configured to alternatively apply torque from one respective hip to the other respective hip based on the runner's movement further comprises the leaf-spring configured to bend responsive to difference in respective angles between the runner's two hip joints and configured to apply torque as a function of the difference between the runner's two hip joints.

5. The exoskeleton according to claim 4, wherein the leaf-spring configured to bend responsive to difference in respective angles between the runner's two hips and configured to apply torque as a function of the difference between the runner's two hip joints comprises:
    the-spring configured to bend responsive to movement of the other respective hip in a second forward motion and to apply the torque to the respective hip with a proceeding second backwards motion.

6. The exoskeleton according to claim 5, the leaf-spring fixed attached to the right hip attachment and the left attachment.

7. The exoskeleton according to claim 6, the leaf-spring fixed attached to the right hip attachment and the left attachment at an angle of ninety degrees.

8. A method of reducing metabolic rate by utilizing an exoskeleton, comprising:
    attaching an exoskeleton to a runner, the exoskeleton comprising:
        a right hip attachment, the right hip attachment comprising of a right frame and a right ribbon;
        a left hip attachment, the right hip attachment comprising of a right left frame and a left ribbon;
        a belt connected to the right hip attachment and the left hip attachment; and
        a leaf-spring attached to the right hip attachment and the left attachment,
        wherein attaching the exoskeleton to the runner comprises:
    attaching the right frame to the runner's right thigh;
    attaching the left frame to the runner's left thigh; and
    attaching the exoskeleton to the runner's body utilizing the belt; and
    applying torque from one respective hip to another hip based on the runner's movement; and
    changing an arc of the leaf-spring by utilizing at least one or more of rack-and-pinion mechanisms.

9. The method of claim 8, further comprising:
    increasing stiffness of the leaf-spring by decreasing an arc of the leaf-spring by utilizing the at least one or more of rack-and-pinion mechanisms.

10. The method of claim 9, further comprising:
    decreasing stiffness of the leaf-spring by increasing the arc of the leaf-spring by utilizing the at least one or more of rack-and-pinion mechanisms.

11. The method of claim 9, wherein the leaf-spring fixedly attached to the right hip attachment and the left attachment at an angle.

12. The method of claim 11, where the angle is of ninety degrees.

13. An exoskeleton, comprising:
    a right hip attachment, the right hip attachment comprising of a right frame and a right ribbon, the right ribbon configured to attach the right frame to a runner's right thigh;
    a left hip attachment, the right hip attachment comprising of a right left frame and a left ribbon, the left ribbon configured to attach the left frame to the runner's left thigh;
    a belt connected to the right hip attachment and the left hip attachment, the belt configured to attach the exoskeleton to the runner's body;
    a leaf-spring attached to the right hip attachment and the left hip attachment, the leaf-spring configured to couple two hips and apply torque from one respective hip to another respective hip based on the runner's movement; and
    a right gear mechanism and a left gear mechanism, the right gear mechanism and the left gear mechanism comprising respectively of rack-and-pinion mechanism and configured to change an arc of the leaf-spring.

14. The exoskeleton according to claim 13, wherein the leaf-spring configured to apply torque from one respective hip to the other respective hip based on the runner's movement comprises:

the-spring configured to bend responsive to movement of a respective hip in a forward direction and to apply the torque to the hip when engaged in a proceeding backwards motion.

15. The exoskeleton according to claim 14, wherein the leaf-spring configured to alternatively apply torque from one respective hip to the other respective hip based on the runner's movement further comprises the leaf-spring configured to bend responsive to difference in respective angles between the runner's two hip joints and configured to apply torque as a function of the difference between the runner's two hip joints.

* * * * *